Nov. 18, 1941.   G. W. WOODS   2,262,983
METHOD OF HARD FACING
Filed April 27, 1940

Gorham W. Woods
INVENTOR
BY Jesse R. Stone
ATTORNEY

Patented Nov. 18, 1941

2,262,983

UNITED STATES PATENT OFFICE 2,262,983

METHOD OF HARD FACING

Gorham W. Woods, Houston, Tex., assignor to Hughes Tool Company, Houston, Tex., a corporation of Delaware Application April 27, 1940, Serial No. 331,949

1 Claim. (Cl. 22—65)

This invention relates to the application of a hard surfacing layer to bushings, nipples and other similar tools or devices.

It is an object of the invention to place a quantity of hard material in granulated or comminuted form in position in the bushing and to heat said material to a fusing point while it is in such position and to distribute the molten metal uniformly by the action of centrifugal force.

It is an object to melt the material to be thus cast in place by the use of a torch or other means for applying the heat directly upon the material to be fused.

I desire to provide a simple and economical method of hard facing a tubular member which can be easily handled and which will produce uniform results.

Referring to the drawing herewith, Fig. 1 is a central longitudinal section through an apparatus for carrying out the invention.

Figure 2:
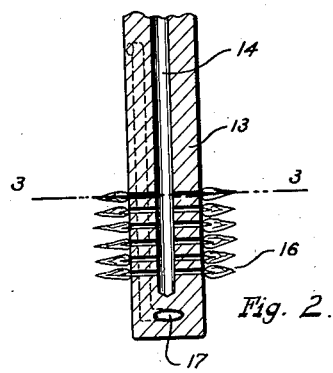
Fig. 2 is a longitudinal section through a torch construction which may be used.
Figure 3:
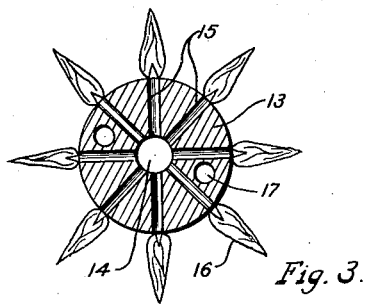
Fig. 3 is a transverse section on the line 3—3 of Fig. 2.

I have shown a bearing bushing 1 to be hard faced on its inner surface between its ends. Said bushing is shaped on its outer periphery to engage within the rotating member for which it forms a bearing.

I have shown it tapered or beveled at 2 to engage within a bearing recess. The interior of the bushing 1 is recessed between its ends at 3 to receive the hard material.

Said bushing is fixed in axial position within a rotatable head 4. A chamber 5 is formed in the head 4 to receive the bushing. Set screws 6 in the wall of the chamber may be used to fix the bushing in position and center said bushing in chamber 5. The head 4 is secured to a shaft 7 which is rotatable by any desired means. I have shown a pulley 8 and belt 9 by means of which any preferred form of prime mover may be used to rotate the shaft 7 and head 4.

To allow for the escape of gases or fumes arising in the welding operation, the head below the recess 5 has an opening 10 leading to a recess having radial openings 11 therein.

The hard facing material is employed in granulated form. It is of any preferred composition but should be of material melting at temperatures ranging from 2000° F. to 2500° F., which is below the melting point of the steel of the bushing.

Figure 1:
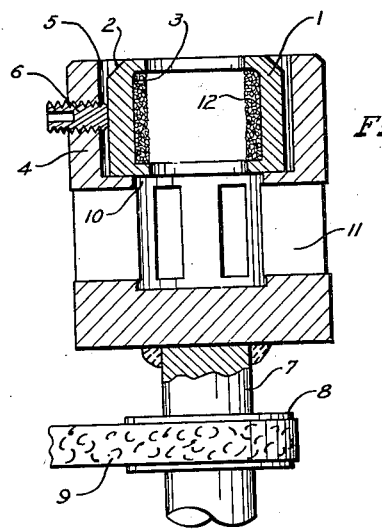

This material is placed in position within the recess 3 of the bushing and the head rotated to hold it in position as shown at 12 in Fig. 1.

Figure 4:
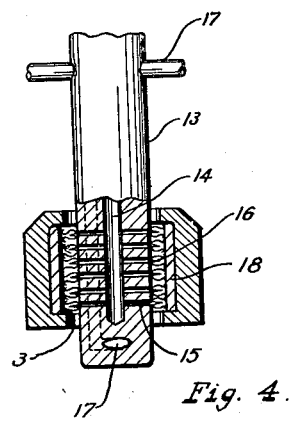
Fig. 4 is a side view, partly in section, showing the torch in operating position.

A torch or similar heating device is then introduced to melt the charge of hard material while the head is rotating. I have shown an oxyacetylene torch which may be employed. Said torch includes a cylindrical member 13 having an axial passage 14 therein for gas. From this passage are a plurality of radial ports 15 through which the gas may be projected against the hard material in the bushing. In Fig. 4 it will be seen that the flame 16 will engage directly upon the material to be melted.

The torch may be cooled by the circulation of cooling fluid therethrough and at 17 is shown a passage through which such fluid may be circulated during the welding operation.

When the charge of material has been fused the centrifugal action of the rotating mold formed by the bushing will distribute the molten metal in a layer on the interior of the recess 3 as indicated at 18 in Fig. 4. The torch may be then withdrawn and when the bushing has cooled, the rotation may be discontinued and the bushing removed.

It will be observed that the operation of my method is simple and rapid and that no expensive or elaborate mechanism is required. The heat is applied directly upon the hard metal in a most economical manner. After the bushing has been removed, the ends of the same may be machined to the desired diameter on its interior and it is ready for use. The idea is capable of general application.

What is claimed is:

The method of securing a hard bearing surfacing material to the inner face of a tubular steel bushing, comprising recessing the inner face of said bushing to leave a thin retaining wall at both ends of said recessed face, filling said recess with loose particles of homogeneous comminuted hard metal having a melting point lower than the steel of the bushing and rotating said bushing to retain said particles in position, applying heat from a torch uniformly throughout the length of the recess to simultaneously melt all said hard particles, the temperature of said torch being below the melting point of said steel, whereby the molten hard material will not mix with said steel, removing the torch, cooling said hard material, then stopping said rotation and machining away said retaining walls.

GORHAM W. WOODS.